3,839,354
DIISOCYANATE HYDANTOIN COMPOUNDS

Juergen Habermeier, Pfeffingen, Basel-Land, and Daniel Porret, Binningen, Switzerland, assignors to Ciba-Geigy AG, Basel, Switzerland
No Drawing. Filed Oct. 4, 1971, Ser. No. 186,539
Claims priority, application Switzerland, Oct. 8, 1970, 14,892/70
Int. Cl. C07d 49/32
U.S. Cl. 260—309.5        5 Claims

ABSTRACT OF THE DISCLOSURE

Diisocyanate hydantoin compounds are prepared by adding two moles of a diisocyanate such as hexamethylenediisocyanate or isophoronediisocyanate, to one mol of a N(3)-hydroxyethyl-hydantoin, such as 3(2'-hydroxy-2-methylethyl)-5,5-dimethyl hydantoin. The diisocyanate hydantoin compounds may be crosslinked with the customary curing agents for polyisocyanates and the crosslinked materials may be used as fibers, films, foams and adhesives.

Example: the new diisocyanate of the formula

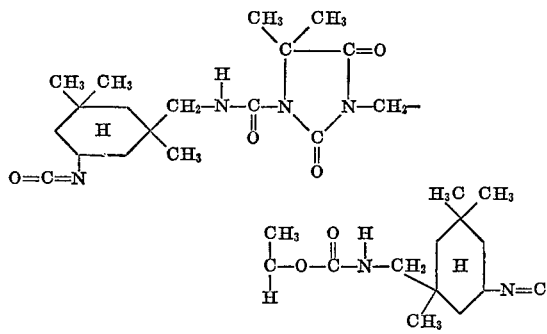

The subject of the present invention are new polyisocyanates of the formula

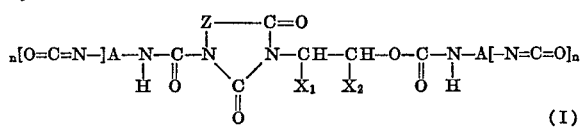
(I)

wherein A denotes a $(n+1)$-valent aliphatic, cycloaliphatic, cycloaliphatic-aliphatic, araliphatic, aromatic or heterocyclic-aliphatic radical, Z represents a divalent radical of the formula

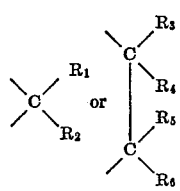

wherein $R_1$ and $R_2$ each denote a hydrogen atom or an aliphatic, cycloaliphatic, araliphatic or aromatic hydrocarbon radical, or wherein $R_1$ and $R_2$ together form a divalent aliphatic or cycloaliphatic hydrocarbon radical, $R_3$ and $R_5$ each denote a hydrogen atom or an aliphatic, cycloaliphatic, araliphatic or aromatic hydrocarbon radical and $R_4$ and $R_6$ each represent a hydogen atom or an alkyl radical, $X_1$ denotes a hydrogen atom or the methyl radical and $X_2$ denotes a hydrogen atom, a methyl radical, ethyl radical or phenyl radical, or $X_1$ and $X_2$ together denote a trimethylene radical or tetramethylene radical, and $n$ denotes an integer having a value of at least 1 and at most 3.

In the above formula (I), A preferably denotes an aliphatic, cycloaliphatic, cycloaliphatic-aliphatic, araliphatic or aromatic hydrocarbon radical or a N-heterocyclic-aliphatic radical; $R_1$ and $R_2$ preferably denote hydrogen atoms or lower alkyl radicals with 1 to 4 carbon atoms, or $R_1$ and $R_2$ together denote the tetramethylene or pentamethylene radical; $R_3$, $R_4$, $R_5$ and $R_6$ preferably denote hydrogen atoms or lower alkyl radicals with 1 to 4 carbon atoms, $X_1$ is preferably a hydrogen atom and $X_2$ a hydrogen atom, a methyl group, ethyl group or phenyl group, and $n$ preferably denotes the number 1.

Depending on the starting substances, the new polyisocyanates are viscous to glassy-brittle, colourless to light ochre-coloured, glass-clear substances.

They can be crosslinked with the customary curing agents for polyisocyanates, for example with polyols, polyamines or polymercaptans, as a rule whilst being shaped, to give plastics. Reaction with diols or polyalcohols, for example polyester-glycols or polyether-glycols, yields polyurethanes which can be used as fibres, films, foams, adhesives or mouldings, in accordance with the employed polyisocyanates according to the invention and polyalcohols. A summarising description of the manufacture of polyurethanes is given in Vieweg-Höchtlen, Kunststoffhandbuch (Plastics Handbook), volume 7, page 207 and thereafter.

The new polyisocyanates according to the invention can furthermore be used for the manufacture of polyureas, for which the polyisocyanates are reacted with organic diamines or polyamines. Since the isocyanate group can add onto urea groupings already formed, branched or crosslinked polyureas containing biuret groups are produced.

According to the invention, the new polyisocyanates of the formula (I) are manufactured by reacting, with warming, 1 mol of a N-heterocyclic monohydroxy compound of the general formula

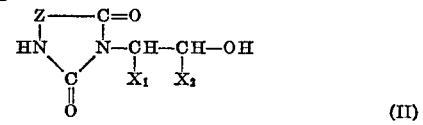
(II)

with 2 mols of a polyisocyanate of the general formula
$$A[-N=\!=\!O]_{n+1} \quad (III)$$
wherein the symbols A, Z, $X_1$, $X_2$ and $n$ in the formulae (II) and (III) have the same meaning as in the formula (I).

The reaction of the N-heterocyclic monohydroxy compounds (II), with the polyisocyanates (III) is advantageously carried out in the temperature range of 60–200° C., preferably at temperatures of 80–150° C., for, for example, 2 to 20 hours. The reaction can be carried out in the presence of solvents but is preferably carried out in the absence of solvents and with exclusion of atmospheric moisture. It is advantageous to react the N-heterocyclic compounds of the formula (II) with the polyisocyanates (III) in the stoichiometric quantity ratio (molar ratio 1:2); however, the polyisocyanates can also be employed in a stoichiometric excess, so that the molar ratio of the N-heterocyclic compounds (II) to the polyisocyanates (III) in the reaction mixture can, for example be between 1:2 and 1:10.

The N-heterocyclic monohydroxy compounds of the formula (II) are obtained in a known manner by reacting 1 mol of a mononuclear N-heterocyclic compound of the general formula

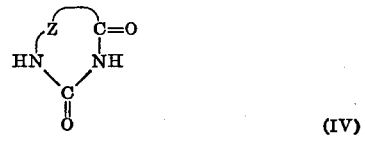
(IV)

wherein Z has the same meaning as in the formula (I), with 1 mol of a monoepoxide of the formula

(V)

wherein $X_1$ and $X_2$ have the same meaning as in the formula (I), in the presence of a suitable catalyst.

In the reaction of hydantoins and dihydrouracils with a monoepoxide of the formula (V), the acid NH group in the 3-position of the ring reacts more rapidly than the NH group in the 1-position of the ring. Hence, the more strongly acid NH group can be reacted substantially quantitatively with the monoepoxide before the less acid or practically neutral NH group has reacted significantly. If, therefore, the reaction leading to the monohydroxy compound is interrupted at the right moment (on showing that about 1 mol of monoepoxide has been consumed per mol of the N-heterocyclic compound (IV), the compound of the formula (II) is obtained as the main product.

The addition of a monoepoxide to the NH group present in the 3-position of the N-heterocyclic compound of the formula (IV) can be carried out in the presence of either acid or alkaline catalysts, and as a rule a slight stoichiometric excess of the monoepoxide is employed.

Preferably, alkaline catalysts, such as tetraethylammonium chloride or tertiary amines, are employed when manufacturing the monoalcohols of the formula (II). However, alkali halides, such as lithium chloride or sodium chloride, can also be employed successfully for this addition reaction; the reaction also takes place without catalysts.

The mononuclear N-heterocyclic compounds of the formula (IV) used for the manufacturer of the alkene oxide addition products of the formula (II) are above all hydantoin, hydantoin derivatives, dihydrouracil and dihydrouracil derivatives.

Hydantoin and its preferred derivatives correspond to the general formula

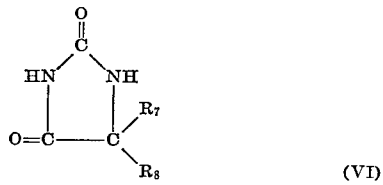
(VI)

wherein $R_7$ and $R_8$ each denote a hydrogen atom or a lower alkyl radical with 1 to 4 carbon atoms, or wherein $R_7$ and $R_8$ together form a tetramethylene or pentamethylene radical. Hydantoin, 5-methyl-hydantoin, 5-methyl - 5 - ethylhydantoin, 5-n-propyl-hydantoin, 5-isopropyl - hydantoin, 1,3-diaza-spiro(4,5)-decane-2,4-dione, 1,3-diaza-spiro(4,4)-nonane-2,4-dione and preferably 5,5-dimethyl-hydantoin may be mentioned.

Dihydrouracil (=2,4-dioxo-hexahydropyrimidine) and its preferred derivatives correspond to the general formula:

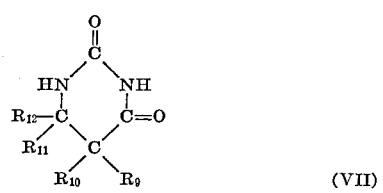
(VII)

wherein $R_9$ and $R_{10}$ both denote a hydrogen atom or identical or different alkyl radicals, preferably alkyl radicals with 1 to 4 carbon atoms, and $R_{11}$ and $R_{12}$ independently of one another each denote a hydrogen atom or an alkyl radical.

Preferably, in the above formula, both radicals $R_7$ and $R_8$ denote methyl groups, $R_9$ denotes a hydrogen atom or a lower alkyl radical with 1 to 4 carbon atoms, and $R_{10}$ denotes a hydrogen atom. 5,6-Dihydrouracil, 5,5-dimethyl - 5,6 - dihydrouracil (2,4-dioxo-5,5-dimethylhexahydropyrimidine) and 5,5-dimethyl-6-isopropyl-5,6-dihydro-uracil (2,4-dioxo-5,5-dimethyl-6-isopropylhexahydropyrimidine) may be mentioned.

As monoepoxides of the formula (V) which are added onto the N-heterocyclic compounds of the formula (IV) so as to form the N-heterocyclic monohydroxy compounds of the formula (II), there may be mentioned: ethylene oxide, (ethene oxide), propylene oxide (propene oxide), 1,2,-butene oxide, 2,3-butene oxide, styrene oxide, 1,2-cyclopentene oxide, and 1,2-cyclohexene oxide.

A preferred sub-category of N-heterocyclic monohydroxy compounds which are employed as starting substances thus corresponds to the formula

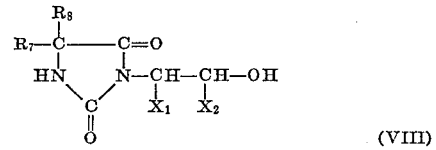
(VIII)

wherein $X_1$ and $X_2$ have the same meaning as in the formula (I) and wherein $R_7$ and $R_8$ have the same meaning as in the formula (VI). 3(2'-Hydroxy-ethyl)-5,5-dimethylhydantoin, 3 - (2'-hydroxy-n-propyl)-5,5-dimethylhydantoin, 3 - (2' - hydroxy-n-butyl)-5,5-dimethylhydantoin, 3 - (2' - hydroxy-2'-phenylethyl)-5,5-dimethylhydantoin, 3 - (2'-hydroxy-n-propyl)-5,5-tetramethylenehydantoin and 3-(2'-hydroxyl-1,2-tetramethylene)-5,5-dimethylhydantoin may be mentioned.

A further preferred sub-category of N-heterocyclic monohydroxy compounds which are employed as starting substances corresponds to the formula

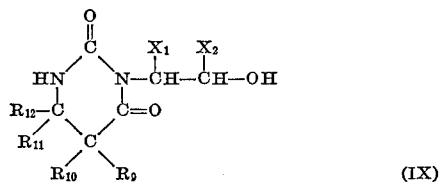
(IX)

wherein $X_1$ and $X_2$ have the same meaning as in the formula (I) and wherein $R_9$, $R_{10}$, $R_{11}$ and $R_{12}$ have the same meaning as in the formula (VII). 3-(2'-Hydroxyethyl) - 5,5 - dimethyl-6-isopropyl-5,6-dihydrouracil, 3-(2' - hydroxy-n-propyl)-5,5-dimethyl-6-isopropyl-5,6-dihydrouracil and 3-(2'-hydroxy-2'-phenylethyl)-5,5-dimethyl-6-isopropyl-5,5-dihydrouracil may be mentioned.

Possible polyisocyanates of the formula (III) are, above all, diisocyanates of the aliphatic, cycloaliphatic, araliphatic, aromatic and heterocyclic-aliphatic series.

As diisocyanates of the aliphatic, cycloaliphatic and araliphatic series there may be mentioned: ethylenediisocyanate trimethylenediisocyanate, tetramethylenediisocyanate, hexamethylenediisocyanate, decamethylenediisocyanate, 2,2,4- and 2,4,4-trimethylhexamethylenediisocyanate or their technical mixtures; diisocyanates of the formula OCN—Y—NCO, wherein Y denotes the hydrocarbon radical of an optionally hydrogenated dimerised fatty alcohol; cyclopentylene-1,3-diisocyanate, cyclohexylene - 1,4 - diisocyanate, -1,3-diisocyanate or -1,2-diisocyanate, hexahydrotoluylene - 2,4 - diisocyanate or -2,6-diisocyanate, 3,5,5 - trimethyl-3-isocyanatomethyl-cyclohexane-1-isocyanate (="isophorone-diisocyanate"); dicyclohexyl-methane-4,4'-diisocyanate.

As diisocyanates of the aromatic series there may be mentioned: o-, m- and p-xylylene-α,α-diisocyanate, toluylene-2,4-diisocyanate, toluylene-2,6-diisocyanate or their technical mixtures; diphenylmethane-4,4'-diisocyanate, naphthalene - 1,5 - diisocyanate, 3,3'-dimethyl-4,4'-diisocyanate, 3,3' - dimethyl-biphenyl-4,4'-diisocyanate, 3,3' - dimethoxy - 4,4' - diphenyl-diisocyanate, 3,3'-dichloro-diphenyl - 4,4' - diisocyanate, 4,4' - diphenyl-diisocyanate, diphenyl-dimethyl-methane - 4,4' - diisocyanate, p,p'-dibenzyl-diisocyanate, phenylene-1,4-diisocyanate; phenylene - 1,3 - diisocyanate, 2,3,5,6-tetramethyl-p-phenylene-diisocyanate; the uretdione-diisocyanates obtainable by dimerisation of aromatic diisocyanates, such as, for example, of 2,4-toluylenediisocyanate, for example 1,3-bis-(4'-methyl-3' - isocyanato-phenyl)-uretdione of the formula

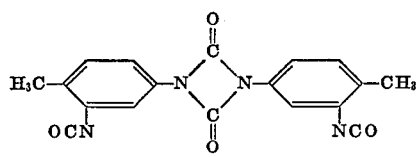

N,N'-di-(4-methyl-3-isocyanato-phenyl)-urea.

Additionally, the following diisocyanates can be employed: the addition products of 2 mols of toluylene-2,4-diisocyanate to one mol of a glycol, as discussed by E. Müller in Houben-Weyl, 4th edition, volume XIV/2, on pages 66 and 71–72, and also the corresponding addition products of 2 mols of "isophoronediisocyanate" to 1 mol of a glycol.

As diisocyanates of the heterocyclic-aliphatic series there may be mentioned:

1,3-di-(γ-isocyanatopropyl)-hydantoin,
1,3-di-(γ-isocyanatopropyl)-5-methyl-hydantoin,
1,3-di-(γ-isocyanatopropyl)-5,5-dimethyl-hydantoin,
1,3-di-(γ-isocyanatopropyl)-5-methyl-5-ethyl-hydantoin,
1,3-di-(γ-isocyanatopropyl)-5-ethyl-hydantoin,
1,3-di-(γ-isocyanatopropyl)-5-propyl-hydantoin,
1,3-di-(γ-isocyanatopropyl)-5-isopropyl-hydantoin,
1,3-di-(γ-isocyanatopropyl)-1,3-diazaspiro-(4,4)-nonane-2,4-dione and
1,3-di-(γ-isocyanatopropyl)-1,3-diazaspiro-(4,5)-decane-2,4-dione,
1,3-di-(γ-isocyanatopropyl)-5,5-dimethyl-5,6-dihydrouracil and
1,3-di-(γ-isocyanatopropyl)-5-methyl-5,6-dihydrouracil;
1,1'-methylene-bis-(3-γ-isocyanatopropyl-hydantoin);
1,1'-methylene-bis-(3-γ-isocyanatopropyl-5,5-dimethylhydantoin);
1,1'-methylene-bis-(3-γ-isocyanatopropyl-5-methyl-5-ethylhydantoin);
bis-(1'-γ-isocyanatopropyl-hydantoinyl-3')-methane;
1,2-bis-(1'-γ-isocyanatopropyl-5',5'-dimethylhydantoinyl-3')-ethane;
1,4-bis-(1'-γ-isocyanatopropyl-5'-methyl-5'-ethylhydantoinyl-3')-butane;
1,6-bis-(1'-γ-isocyanatopropyl-5'-isopropylhydantoinyl-3')-hexane;
1,12-bis-(1'-γ-isocyanatopropyl-5',5'-pentamethylenehydantoinyl-3')-dodecane and
β,β'-bis-('-γ-isocyanatopropyl-5',5'-dimethylhydantoinyl-3')-diethyl-ether.

Furthermore, triisocyanates and tetraisocyanates of the aliphatic, cycloaliphatic, araliphatic, aromatic or heterocyclic series can also be employed. As such there may, for example, be mentioned: benzene-1,3,5-triisocyanate, toluylene - 2,4,6-triisocyanate, ethylbenzene-2,4,6-triisocyanate, monochlorobenzene - 2,4,6 - triisocyanate, triphenyl-methane - 4,4',4" - triisocyanate, diphenyl-2,4,4'-triisocyanate, 4,4' - methylene-bis-(o-toluylenediisocyanate) and thiophosphoric acid-tris(4-isocyanato-phenyl ester).

Further, triisocyanates and tetraisocyanates having a biuret structure can be employed, such as are obtainable, for example, by reaction of 3 to 4 mols of a diisocyanate with 1 mol of a diamine, for example a ω,ω'-diaminopolyether (compare German Published Specification 1,215,365).

Equally, it is possible to employ triisocyanates or tetraisocyanates which can be manufactured by addition to trihydroxy or tetrahydroxy compounds, for example 1,1,1-trimethylolpropane or pentaerythritol, of 1 mol per hydroxyl group of a diisocyanate of which the two isocyanate groups have different reactivities (for example, 2,4-toluylene-diisocyanate or "isophoronediisocyanate").

The new polyisocyanates of the formula (I) can be reacted, in a known manner, with compounds which possess hydrogen atoms replaceable by alkali. As examples of such compounds or classes of compounds there may be mentioned: alcohols, amines, carboxylic acids, phenols, ureas, urethanes, hydrazines, water, ammonia, bisulphate, imines, thioureas, sulphimides, amides, thiols, aminoalcohols, sulphonamides, hydrazones, semicarbazones, oximes, hydroxycarboxylic acid, aminocarboxylic acids and all polymers which contain active hydrogen atoms, for example in the form of hydroxyl, carboxyl, amino or mercapto groups. The new polyisocyanates of the formula (I) can be employed both alone or as mixtures with other known isocyanates, diisocyanates or polyisocyanates, together with polyfunctional H-active compounds, for the purpose of polyaddition and/or crosslinking to give plastics. Depending on the nature and amount of the crosslinks, both very firm brittle materials and plastics having rubbery-elastic properties can be manufactured.

To manufacture thermoplastics, the polyisocyanates of the formula (I) can be reacted with glycols, such as ethylene glycol, 1,3-propylene glycol, 1,4-butanediol or any desired dialcohols which can also carry isocyclic, aromatic or heterocyclic groups, linear hetero-groups or ester groups.

Possible crosslinking agents or curing agents are above all those classes of compounds which give three-dimensionally crosslinked, infusible and insoluble products with the polyisocyanates of the formula (I).

As crosslinking agents or curing agents of this nature, polyhydroxyl compounds are above all employed. As examples, there may be mentioned polyesters, containing hydroxyl groups, from adipic acid, phthalic acid or dimerised unsaturated fatty acids with diols and/or triols, such as ethylene glycol, 1,4-butanediol, 1,5-pentanediol, glycerol and diethylene glycol; castor oil, linear or partially branched polypropylene-ether-glycols and polytetramethylene-ether-glycols; polythioether-glycols and polyacetal-glycols; sugars and sugar derivatives; higher-functional polyols, such as trimethylolpropane.

Further possible crosslinking agents are above all the polyamines, especially aromatic polyamines, such as diaminodiphenylmethane, and such compounds as simultaneously contain hydroxyl and amino groups, such as, for example, tri-iso-propanolamine.

The polyaddition reaction of glycols, polyhydrory compounds and polyamino compounds with the polyisocyanates of the formula (I) can be carried out directly without diluents, and depending on the nature of the reactants temperatures in the range of about 50 to 300° C. may be necessary. The process can also be carried out in diluents, for example halogenobenzenes.

The molecular weight of the polyurethane can be varied in accordance with the variation of the molar ratio of the components, the removal of the heat of reaction from the melt, the increase in the dwell time in the dissolved state, and the addition of monofunctional, that is to say chain-breaking, components, in a manner which is in itself known. In general it is necessary, for use in the plastics field, to polymerise the mixture to an average molecular weight of about 6,000. Low molecular types are above all used in the lacquer field.

The polyaddition reaction can also be carried out in the presence of accelerators; this is, however, not absolutely essential. Possible catalysts are, especially, tertiary amines such as pyridine, N,N'-dimethylpiperazine, N,N-dimethylbenzylamine, tributylamine, triethylamine, N-methylmorpholine, N - methylpyrrole, N - methylpyrrolidine, diaza-(2,2,2)-bicyclooctane or diethyl - 2 - hydroxyethyl-amine, and also metal salts, such as $FeCl_3$, $AlCl_3$, $ZnCl_2$, $SnCl_2$, $tin^{II}$ isooctoate, lead octoate, lead naphthenate and the dilaurate of tin-dibutyl. A survey of the most customary catalysts is furthermore to be found in "Houben-Weyl," 4th edition, volume XIV/2 on page 61 (review by E. Müller).

To manufacture foams, blowing agents and surface-active substances, such as, for example, silicone compounds, acting as foam stabilisers, can furthermore be used conjointly, in a manner which is in itself known.

The manufacture of polyurethane plastics products is as a rule carried out with simultaneous shaping to give castings, foam articles, pressings, lacquer films, laminates, adhesive bonds and the like. Here, the procedure followed is to produce a mixture of the polyisocyanate of the formula (I) and the polyhydroxy compound as well as of the catalyst and/or blowing agent, foam stabiliser and the like which are optionally used conjointly, and then to allow this mixture, after it has been introduced into casting or compression-moulding moulds, spread as coatings or introduced into adhesive joints and the like, to react on application of heat, so as to give the plastic.

A further subject of the invention are therefore moulding compositions which under the action of heat can be converted into mouldings or foam articles including sheet-like structures, such as coatings or adhesive joints, and which contain (a) a polyisocyanate of the formula (I) and (b) a polyhydroxy compound and also, optionally, a curing catalyst and/or blowing agent and foam stabilisers.

Further customary additives for polyisocyanate moulding compositions, such as fillers, reinforcing agents, mould release agents, antioxidants, anti-ageing agents, light protection agents, UV-absorbers, flameproofing substances, optical brighteners, dyestuffs or pigments can, of course, be added to the moulding compositions.

Suitable fillers or reinforcing agents are fibrous or pulverulent inorganic or organic substances. Quartz powder, hydrated aluminium oxide, mica, aluminium powder, iron powder, iron oxide, ground dolomite, chalk powder, gypsum, slate powder, unburnt kaolin (Bolus), glass fibres, boron fibres, carbon fibres, asbestos fibres, natural and synthetic textile fibres, such as polyester, polyamide and polyacrylonitrile fibres, and especially fillers of high water absorbency, such as, for example, anhydrous silicon dioxide, silica aerogel, anhydrous aluminium oxide, active charcoal, zeolites, bentonites and burnt kaolin may be mentioned.

The moulding compositions can furthermore be used, in the unfilled or filled state, as dipping resins, casting resins, laminating resins, impregnating resins, lacquers, coating agents, sealing compositions, potting and insulating compositions for the electrical industry, or adhesives.

In addition to manual processing, the mechanical methods of processing for the manufacture of polyurethane plastics, which permit continuous mixing of the polyisocyanates (a) with the components (b) containing hydroxyl groups, to form a homogeneous melt, can appropriately be used. Thus, the most diverse moulded articles (hard rubber substitutes) can be manufactured by casting or centrifugal casting. Further applications are to be found in the field of casting compositions for filling joints or sealing pipe couplings, and in use as floor coverings or road surfacings, impression compositions or adhesives. Unsupported films, tapes or filaments can be produced simply, and textiles, fibre materials (leather substitute) or paper can be impregnated or coated simply. The new moulding compositions can, if the reaction speed is appropriately adjusted, for example be used for lining containers or for the manufacture of endless tubes of any profile by means of continuously operating heated injection moulding machines. Rigid foams or hard foams manufactured from foam compositions according to the invention are used, for example, as insulating materials for buildings and refrigeration installations, as packaging materials, and above all for shock absorption, for example as vibration-damping constructional components in vehicle construction and machinery building.

In the examples which follow parts denote parts by weight and percentages denote percentages by weight, unless otherwise stated. The relationship of parts by volume to parts by weight is as of the millilitre to the gram.

MODEL EXPERIMENT

The model experiment which follows shows that organic isocyanates react with the $N_1$—H group of hydantoins to give stable adducts. With 5,5-dimethylhydantoin and phenylisocyanate as the model substances, the reaction takes place as follows:

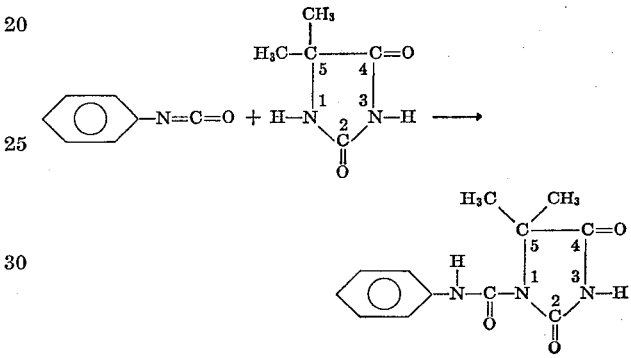

This reaction takes place smoothly and with good yields. It was found that the derivatives thus obtained are at least as heat-stable as the urethanes obtainable from the corresponding isocyanates; this was tested by means of the following experiments:

A mixture of 128.1 g. of 5,5-dimethylhydantoin (1 mol) and 119.2 g. of phenylisocyanate (1 mol) is initially introduced, at room temperature, into a 500 ml. glass flask equipped with stirrer, thermometer and reflux condenser. The resulting paste is heated to 150° C. internal temperature over the course of 15 minutes, whilst stirring. After about 80 minutes under the conditions mentioned, a clear, mobile melt results. This is stirred for a further 2 hours at 160° C. to complete the reaction. On cooling, the mass immediately crystallises. 233 g. of light yellow crystals (yield: 94.3% of theory) are obtained.

For purification, the product is recrystallised from absolute ethanol. Practically colourless, fine crystals are obtained in 69.6% yield of pure material (172 g.); these crystals melt at 166–168° C.

Elementary analysis gives the following result:
Found: 58.11% C; 5.33% H; 16.85% N. Calculated: 58.29% C; 5.30% H; 17.00% N.

The infrared spectrum shows, through the presence of bands for an aromatic ring and bands for the hydantoin skeleton, that the desired product has been produced. This result is further strengthened through the presence of three amide-N—H frequencies (3280 cm.$^{-1}$, 3202 cm.$^{-1}$ and 3095 cm$^{-1}$) and by three carbonyl absorption bands (1782 cm.$^{-1}$, 1740 cm.$^{-1}$ and 1710 cm.$^{-1}$).

The proton-magnetic resonance spectrum (60 Mc-H-NMR, recorded in deuterochloroform at 35° C., with tetramethylsilane as the internal standard) also shows, through the presence of the signals for the aromatic ring at $\delta=6.95$–7.55 (multiplet), the signals for $CH_3$ and N—H group of the hydantoin and the signal for the urea-amide (N—H) group, that the end product obtained has the structure given below:

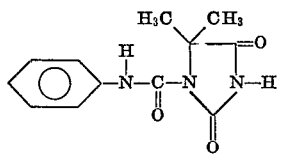

A sample of 70 g. of the compound synthesised in this way is investigated, in a flask fitted with descending condenser and thermometer, for thermal reverse decomposition into phenylisocyanate and dimethylhydantoin. At a bath temperature of 175° C., the substance is completely fused and displays a temperature of 168° C.; no signs of decomposition are detectable. The temperature of the sample is now rapidly raised to 205° C. and here again no trace of decomposition is as yet visible. At 215° C., very slight bubble formation in the melt is detectable. At 232° C. a slow decomposition starts, and when the temperature of the sample is 240° C., phenylisocyanate begins to distill off. At 260° C., a relatively rapid distillation starts.

As a result of this experiment, the decomposition point of the substance can be stated to be about 215–225° C., whilst urethanes from primary aliphatic alcohols and aromatic isocyanates already decompose from about 200° C. onwards.

(A) MANUFACTURING EXAMPLES
Example 1

93 g. of 3-(2'-hydroxy-n-propyl)-5,5-dimethylhydantoin (0.5 mol) are fused, with exclusion of atmospheric moisture, in a glass flask equipped with a reflux condenser, stirrer and internal thermometer, and are then stirred at 90° C. 222 g. of 3,5,5-trimethyl-3-isocyanatomethyl - cyclohexane-1-isocyanate (="isophoronediisocyanate") (1.0 mol) are added dropwise to this melt over the course of one hour at 90° C. The reaction is exothermic so that the heating bath can be removed in order to maintain 90° C.

Thereafter the mixture is stirred for a further 4 hours at 120° C. A sample withdrawn from the reaction mixture then has an isocyanate content of 15%. To complete the reaction, the mixture is now stirred for a further 3 hours at 145–150° C. The hot melt is then poured onto a dry metal sheet. The solidified material can easily be broken or powdered. Clear, transparent, glassy-brittle, practically colourless particles are obtained in quantitative yield and give a white dust on grinding. The isocyanate content of the new adduct is 13.5% (theory 13.35%). The product melts at 78–81° C.

The infrared spectrum (5% strength solution in CHCl₃) shows, through the following absorption bands (in cm.⁻¹), that the desired adduct has been produced: 270 and 1725.

The proton-magnetic resonance spectrum (60 Mc-H-NMR, recorded in an 0.3 molar solution in CDCl₃ at 35° C., against tetramethylsilane as the internal standard) shows, through the 3:1 ratio of the methyl groups on the cycloaliphatic ring to the methyl groups on the heterocyclic ring, that the desired 2:1 adduct has been produced.

The product thus substantially consists of the diisocyanate of the following structure:

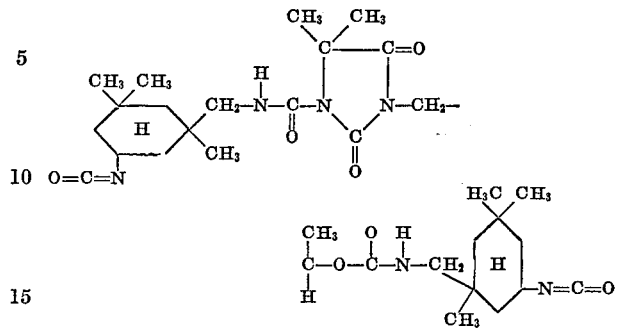

Example 2

A melt of 93.0 g. of 3-(2'-hydroxy-n-propyl)-5,5-dimethylhydantoin (0.5 mol) is stirred at 90° C. in a glass apparatus like that used in Example 1. 168.0 g. of hexamethylenediisocyanate (1.0 mol) are added dropwise thereto over the course of 30 minutes, whilst stirring vigorously.

The reaction then becomes exothermic; after removing the heating bath, the contents of the flask reach a maximum temperature of 115° C. When the exothermic reaction has subsided, the mixture is heated to 121–124° C. for a further four hours, whilst stirring. A sample withdrawn from the batch then shows a content of isocyanate groups of 17.5%. To complete the reaction, the mixture is subsequently stirred further for one hour at 140° C.

The mobile, hot melt is now poured from the flask into a glass bottle and allowed to cool. A clear, highly viscous, pale yellow liquid having an isocyanate content of 14.2% (theory 16.09%) is obtained in quantitative yield.

The mass spectrum shows, through the molecule-ion at 522 mass units and through characteristic fragment ions (for example 522–168), that the desired diisocyanate has been produced.

The infra-red spectrum (recorded as a 100% film on NaCl) shows, inter alia, through the following characteristic absorptions (in cm.⁻¹) that essentially a product of the structure given below has been produced: 3320, 2250, 1780, 1725, 1690, 1540 and 767.

The product thus essentially consists of the diisocyanate of the formula

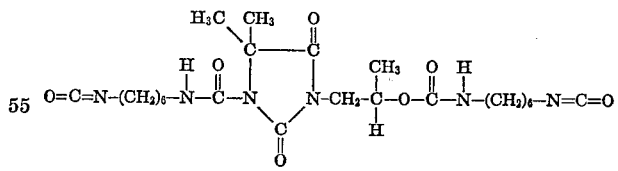

Example 3

106 g. of 3-(2'-hydroxy-n-propyl)-5,5-tetramethylenehydantoin (0.5 mol) are dissolved in 200 ml. of dioxane at 100° C., in a glass apparatus like that used in Example 1. The mixture is heated, whilst stirring, until refluxing commences (108–115° C.). 222 g. of 3,5,5-trimethyl-3-isocyanato-cyclohexane - 1 - isocyanate ("isophoronediisocyanate") are added dropwise to this solution over the course of 2 hours. The reaction is exothermic so that the heating bath can periodically be removed.

The reaction is complete in 7.5 hours. The solution shows an isocyanate content of 7.5% (theory: 7.9%).

For working up, the solution obtained is concentrated under a slight vacuum on a rotary evaporator at 60–70° C. bath temperature and subsequently dried to constant weight at 85° C. under 0.1 mm. Hg.

A colourless, crystalline-glassy product, which essentially consists of the diisocyanate of the formula given below, is obtained in quantitative yield:

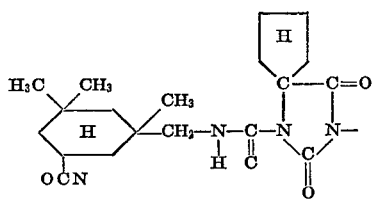

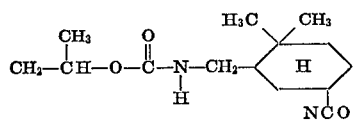

Example 4

Analogously to Example 3, 113.1 g. of 3-(2'-hydroxy-1',2' - tetramethylene-ethyl)-5,5-dimethylhydantoin (0.5 mol) (melting point=159–161° C.) in 200 ml. of dioxane are reacted with 168 g. of hexamethylenediisocyanate (1.0 mol). The reaction is carried out at a bath temperature of 130–140° C. After 8 hours the isocyanate content of the solution has dropped to 10.1%. After a further 2 hours, an NCO content of 9.1% is reached. (Theory 8.72%). The new diisocyanate is worked up in accordance with Example 3 and 281 g. of a colourless, clear, viscous liquid diisocyanate (yield: 100% of theory), containing 15.4% of NCO groups (theory: 14.95%) are obtained. The product essentially consists of the diisocyanate of the following structure:

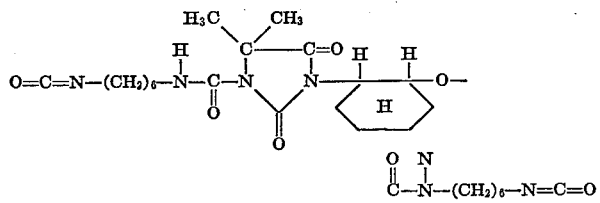

Example 5

67.3 g. of hexamethylenediisocyanate (0.4 mol) are reacted with 45.6 g. (0.2 mol) of 3-(2'-hydroxyethyl)-5,5 - dimethyl-6-isopropyl - 5,6 - dihydrouracil (melting point=129.4° C.–130.4° C.) in dioxane, analogously to Example 3. The mixture is allowed to react for about 5 hours at a bath temperature of 130–140° C. and is then worked up as described in Example 3. 113 g. of a practically colourless product consisting essentially of the diisocyanate of the following structure:

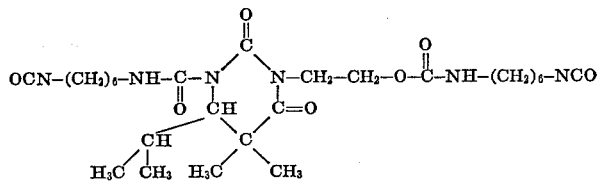

are obtained.

Example 6

37.2 g. of 3-(2'-hydroxy-n-propyl)-5,5-dimethylhydantoin (0.2 mol) in 100 ml. of dioxane are stirred at 100° C. 255.2 g. of a 75% strength solution of "Desmodur N" in xylene/glycol acetate, diluted with 200 ml. of dioxane (0.4 mol) are added dropwise thereto over the course of 15 minutes. The whole is subsequently stirred for 10 minutes under reflux at 104–106° C. After cooling, the mixture is concentrated at 60° C. under 15 mm. Hg and is then dried at 50° C. under 0.1 mm. Hg. 209 g. (91% of theory) of a viscous resin of 15.4% NCO content (theory 14.7%) are obtained.

Example 7

18.6 g. of 3-(2'-hydroxy-n-propyl)-5,5-dimethyl-hydantain (0.1 mol) in 100 ml. of dioxane are stirred at 100° C. A solution of 66.9 g. of 88% strength 1,3-di-(γ-isocyanatopropyl)-5,5-dimethylhydantoin in 200 ml. of dioxane is added dropwise to this clear, colourless solution over the course of 120 minutes. Thereafter the mixture is stirred under reflux for 8 hours at 104° C. It is completely concentrated at 60° C./15 mm. Hg and dried to constant weight at 60° C./0.15 mm. Hg. 85 g. of a highly viscous yellow liquid of 9.74% NCO content (theory 10.84%) are obtained.

(B) USE EXAMPLES

Example I 61.2 parts of the new diisocyanate manufactured according to Example 2 (isocyanate group content: 14.7%) are mixed at 85° C. with 40 parts of a commercially available polyester-alcohol from 2.5 mols of adipic acid, 0.5 mol of phthalic acid and 4 mols of triol, commercially available under the registered trademark "Desmophen 800," to give a homogeneous, clear, practically colourless mixture. After being briefly degassed, the mixture is poured into aluminium moulds and cured over the course of 10 hours at 100° C. A glass-clear, practically colourless moulding having the following properties is obtained:

Flexural strength (VSM 77,103)—9.8 kp./mm.$^2$, no fracture at maximum deflection
Deflection (VSM 77,103)—more than 20 mm.
Impact strength, VSM 77,105—42.5 cm.kp./cm.$^2$
Heat distortion point according to Martens—40° C.
Water absorption (4 days/20° C.)—0.6%

Example II 64.5 parts of the new diisocyanate manufactured according to Example 1 (isocyanate group content: 13.5%) are mixed, analogously to Example I, with 40 parts of the commercially available polyester-alcohol used in Example I ("Desmophen 800"). Processing also takes place analogously to Example I and curing takes place in 12 hours at 90° C. The gel time at 90° C. is 40 minutes.

The glass-clear, practically colourless mouldings thus obtained show the following properties:

Flexural strength (VSM 77,103)—9.3 kp./mm.$^2$
Deflection (VSM 77,103)—>20 mm.
Impact strength (VSM 77,105)—41 cm.kp./cm.$^2$

We claim:
1. A diisocyanate of the formula

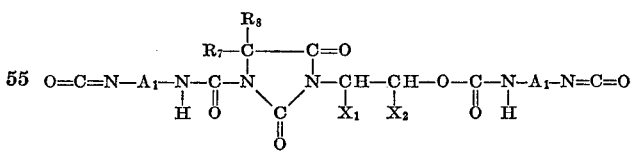

wherein $A_1$ is alkylene of 2 to 12 carbon atoms.

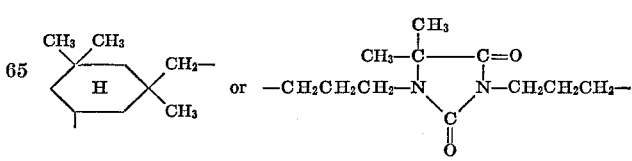

$X_1$ denotes hydrogen or methyl and $X_2$ denotes hydrogen, methyl, ethyl or phenyl or $X_1$ and $X_2$ together denote trimethylene or tetramethylene and $R_7$ and $R_8$ each denote hydrogen or lower alkyl of 1 to 4 carbon atoms, or $R_7$ and $R_8$ together denote tetramethylene or pentamethylene.

2. Diisocyanate according to Patent Claim 1, of the formula

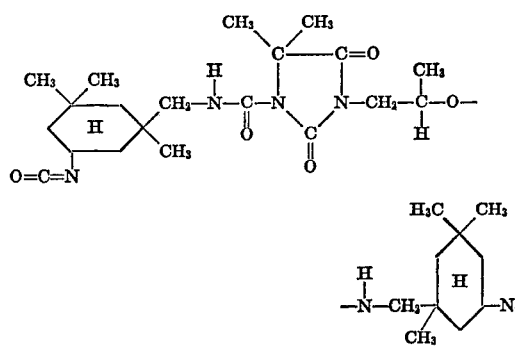

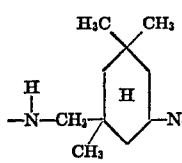

3. Diisocyanate according to Patent Claim 1, of the formula

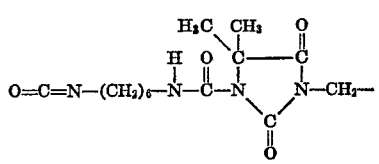

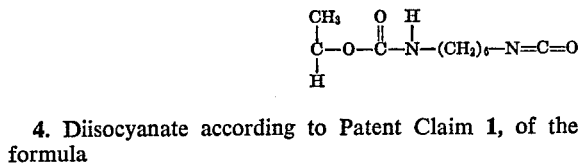

4. Diisocyanate according to Patent Claim 1, of the formula

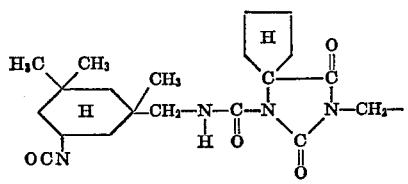

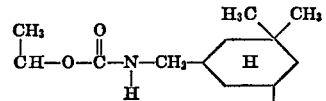

5. Diisocyanate according to Patent Claim 1, of the formula

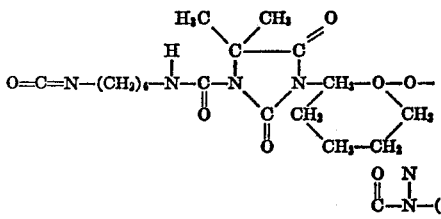

References Cited

UNITED STATES PATENTS

| | | | |
|---|---|---|---|
| 2,960,534 | 11/1960 | Scherer et al. | 260—553 R |
| 3,347,658 | 10/1967 | Luckenbauch | 260—553 R |
| 2,556,146 | 6/1951 | Olsen | 260—482 C |
| 2,856,411 | 10/1958 | Prill | 260—482 C |
| 2,937,119 | 5/1960 | Berger et al. | 260—482 B |
| 3,000,931 | 9/1961 | Frankel | 260—482 C |

FOREIGN PATENTS

| | | | |
|---|---|---|---|
| 1,523,597 | 3/1968 | Belgium | 260—309.2 |

OTHER REFERENCES

Degering: An Outline of Organic Nitrogen Compounds, p. 532, Ypsilanti, Mich., Univ. Lithoprinters, 1950.

Wagner et al.: Synthetic Organic Chemistry, p. 645, N.Y., Wiley, 1953.

NATALIE TROUSOF, Primary Examiner

U.S. Cl. X.R.

260—2.5 AB, 2.5 AT, 9 R, 18 TN, 37 N, 77.5 AB, 77.5 AC, 77.5 AM, 77.5 AP, 77.5 AQ, 77.5 AT, 256.4 C